(No Model.) 3 Sheets—Sheet 1.

G. WITTICH.
COMBINED COTTON AND CORN PLANTER.

No. 520,872. Patented June 5, 1894.

WITNESSES
C. B. Hunt
H. S. Shepard

INVENTOR
George Wittich
by J. R. Littell,
his Attorney

THE NATIONAL LITHOGRAPHING COMPANY,
WASHINGTON, D. C.

(No Model.) 3 Sheets—Sheet 2.

G. WITTICH.
COMBINED COTTON AND CORN PLANTER.

No. 520,872. Patented June 5, 1894.

WITNESSES
C. B. Hunt.
H. S. Shepard.

INVENTOR
George Wittich
by J. B. Littell,
his Attorney

THE NATIONAL LITHOGRAPHING COMPANY,
WASHINGTON, D. C.

(No Model.) 3 Sheets—Sheet 3.

G. WITTICH.
COMBINED COTTON AND CORN PLANTER.

No. 520,872. Patented June 5, 1894.

WITNESSES
C. E. Hunt.
H. S. Shepard

INVENTOR
George Wittich
By J. R. Littell,
his Attorney

UNITED STATES PATENT OFFICE.

GEORGE WITTICH, OF FREYBURG, TEXAS, ASSIGNOR OF ONE-THIRD TO ADOLF F. KAUFFMAN, OF SAME PLACE.

COMBINED COTTON AND CORN PLANTER.

SPECIFICATION forming part of Letters Patent No. 520,872, dated June 5, 1894.

Application filed May 22, 1893. Serial No. 475,152. (No model.)

*To all whom it may concern:*

Be it known that I, GEORGE WITTICH, a citizen of the United States, residing at Freyburg, in the county of Fayette and State of Texas, have invented a new and useful Combined Cotton and Corn Planter, of which the following is a specification.

My invention relates to combined corn and cotton planters, and has for its object to provide a simple and improved construction to effectively carry out the duplex functions of planters of this class, which will possess advantages in point of simplicity, durability, effectiveness, and general efficiency.

For the attainment of the above mentioned objects, and for other purposes mentioned hereinafter, my invention consists in improved organization of parts, and details of construction, all of which will be more fully described hereinafter, and particularly pointed out in the claim.

Figure 1:
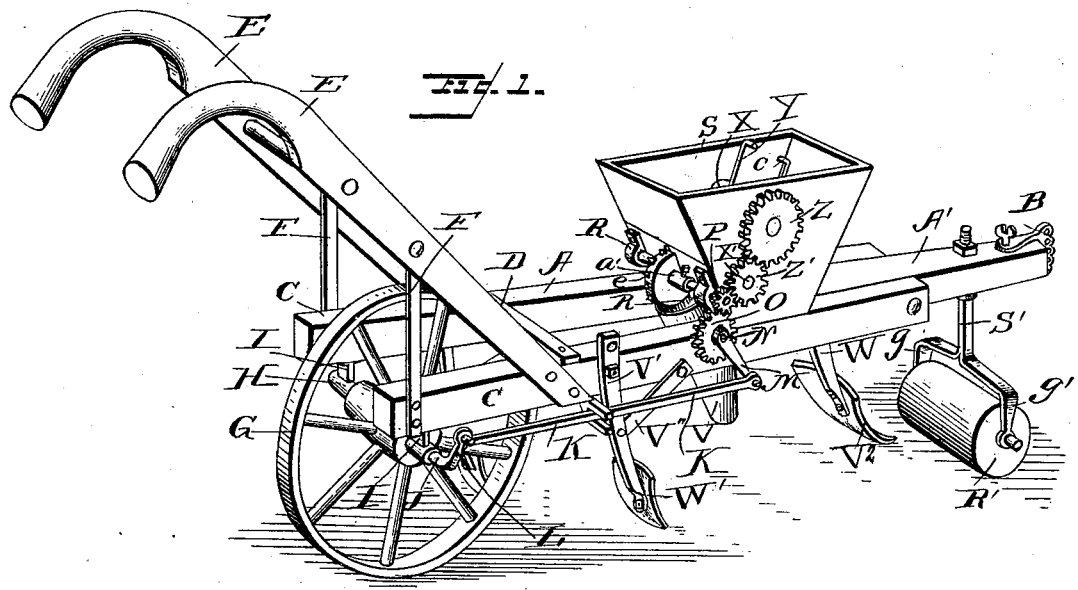
Figure 2:
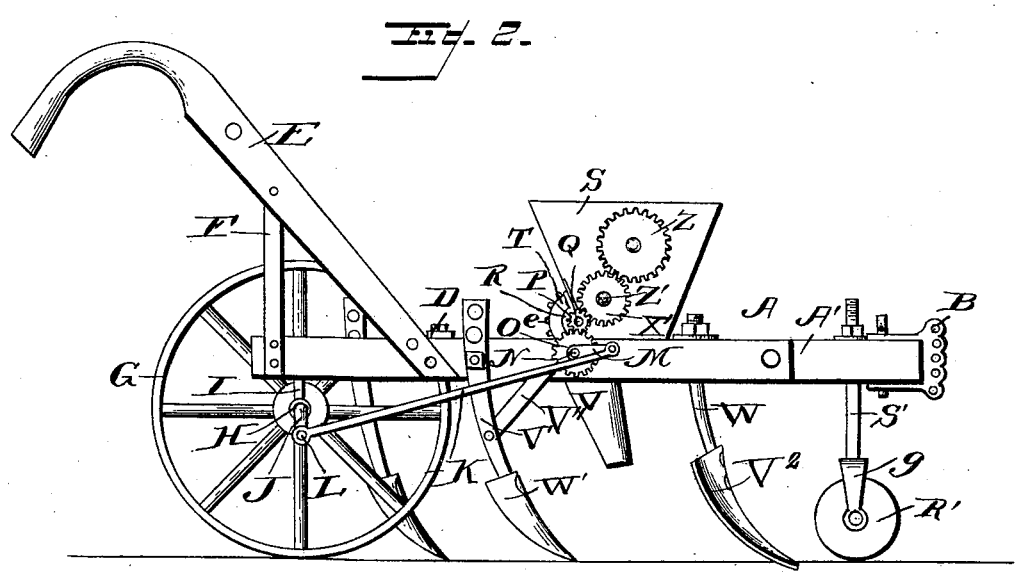
Figure 3:
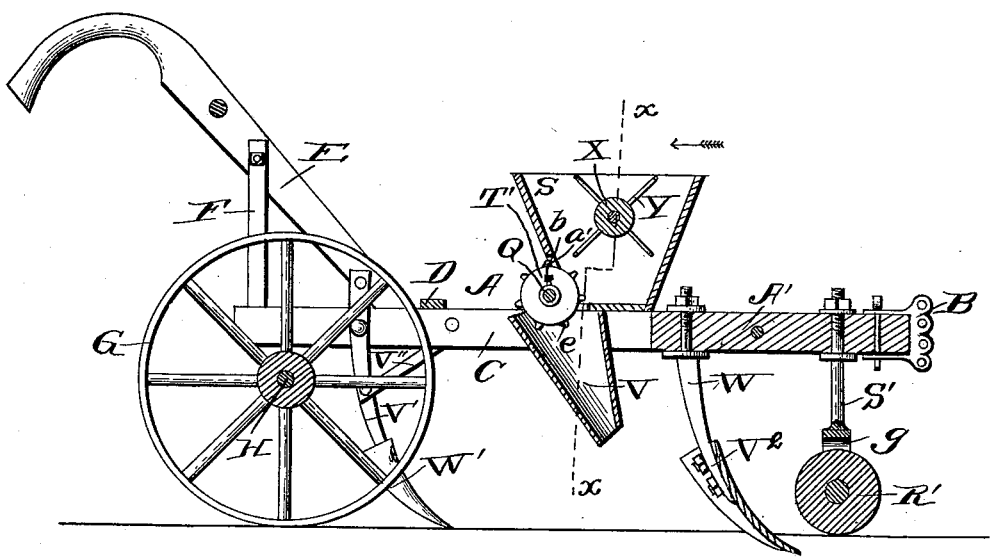
Figure 4:
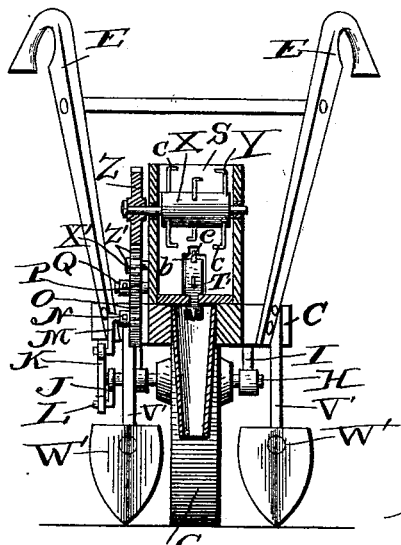
Figure 5:
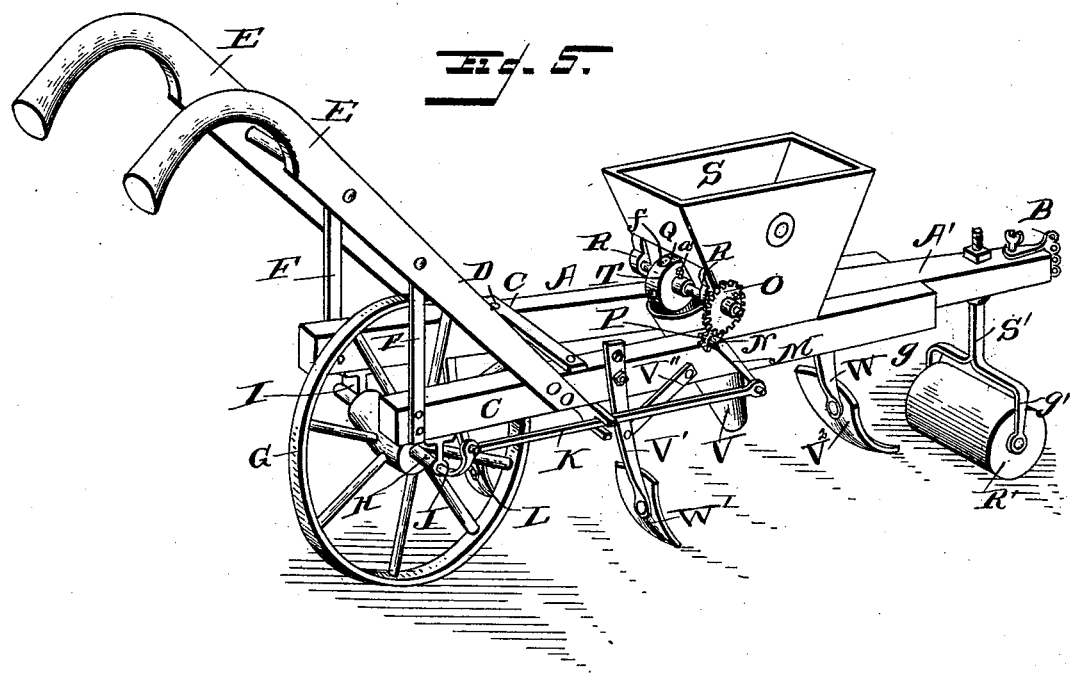
Figure 6:
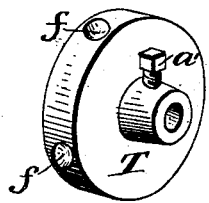
Figure 7:
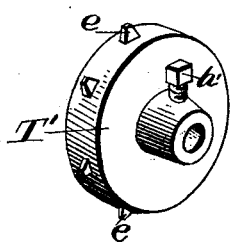

Referring to the accompanying drawings, forming a part of this specification:—Figure 1 is a perspective view of my invention complete as a cotton seed planter. Fig. 2 is a side elevation of the same. Fig. 3 is a longitudinal central sectional view. Fig. 4 is a transverse section, on the line $x$—$x$ Fig. 3. Fig. 5 is a view similar to Fig. 1 showing the implement as changed to a corn planter; and Figs. 6 and 7 are detail perspective views of the corn and cotton-seed-feed cylinders, respectively.

Like letters of reference indicate like or corresponding parts in the several views of the drawings.

Referring to Figs. 1, 2, and 3, A indicates the bifurcated main-beam comprising the front or clevis-beam, A', provided with a clevis B, and the rear portion consisting of the two divergent rearwardly extending hound-beams, C C, bolted at their front extremities respectively to the sides of the rear end of the clevis-beam A' and held the necessary distance apart by the stay-brace, D, bolted across as shown, intermediate of the length of the hound-beams.

The handles, E E, are of the ordinary construction, secured severally at their lower ends to the beams C C by bolts, and are held in their proper inclined position by the vertical brace-plates, F F, respectively attached at the lower extremities to the beams C C and at their upper ends to the handles E E. The ground or drive-wheel G, is journaled on an axle, H, secured in suitable oppositely situated bearing-brackets, I, depending from the beam C C; said axle being provided at one end with a crank extension, J, formed integral therewith and serving to support and impart motion to the connecting rod K, fastened at one extremity to the crank extension J by a crank-pin L, and at its other to the crank-arm M, of the end of the stud-shaft, N, which is journaled in the hound-beam C and carries the power-gear, O, keyed thereon between the crank-arm N and the adjacent side of the hound-beam C, and intermeshing with the pinion P keyed on the end of the transverse shaft, Q, which is journaled in the bearing-brackets, R, R, fastened to the rear side of the seed hopper, S. On the shaft Q and intermediate of the ends thereof, is located the seed-feed-cylinder, T or T', as shown in Figs. 5 and 6, the construction and operation of which will appear hereinafter. The shaft Q is rendered removable by a nut (not shown) on one extremity holding the pinion P, and the feed-cylinder T or T' is likewise removable from the shaft Q by a key-pin, $a'$. By this construction the shaft Q, the feed-cylinder T or T', and the pinion P can be readily removed.

The hopper S is secured in an upright position on the main beam and is of the usual shape and construction to receive and permit the descent of the seed through a slot or opening, $b$, in which the feed cylinder T or T', rotates to feed the seed through said opening into the usual depending seed-dropping-chute, V, of suitable shape and arranged directly underneath the feed-cylinder to receive the seed therefrom and to direct the same into the coincident furrow in the ground made by the furrow opener, $V^2$, secured in alignment in front of the feed-chute and mounted on a vertically adjustable tang or standard, W, attached to the main beam.

Inside of the hopper S is located a seed-agitator comprising a rotary cylinder X, provided on its periphery with a number of spaced, radially-projecting agitating fingers, Y, severally having their outer ends bent into short horizontal lugs *c c*. This cylinder is removably journaled in the bearing openings in opposite sides of the hopper, as shown, and on one end which is reduced and projects through the side of the hopper is keyed removably the spur-wheel Z, receiving motion from the idle gear Z', mounted removably on the arbor, X', journaled in the side of the hopper, said side gear intermeshing with the pinion P on one side and the spur-wheel on the other. It will be noted that the train of gearing, the several shafts, the feed cylinder and the agitator cylinder can be removed at will and the gearing interchanged and differentiated in speed relation.

In the rear of the seed-chute V, are secured the covering sweeps, W' W', respectively attached in the same vertical plane to the vertically adjustable standards, V' V', severally fastened by bolts and nuts to the hound-beams C C on each side of the furrow made by the opener hoe $V^2$ in order to cover the seed as it is dropped in the furrow. Each standard V' V' is braced against displacement by an oblique brace-plate, V''.

Referring to Figs. 6 and 7 the feed-cylinder T', in Fig. 7, is provided with spikes or spurs, *e e*, around its periphery and constitutes the cotton seed-feed-cylinder, while the cylinder T, in Fig. 6 is the corn-feed-cylinder and to that end is provided with the spaced pockets, *f f*, on its periphery to receive and hold the corn until it is dropped by gravity into the chute when such pocket registers with said chute.

As shown in Fig. 1, the arrangement of the parts and of the cotton-seed-cylinder and the agitating mechanism indicates that such construction renders my invention a cotton-seed planter, whereas, in Fig. 5, the absence of the agitating mechanism and its gearing, the interchange of gearing to reduce the speed of feed-cylinder, and the substitution of the feed-cylinder T for the cylinder T' show the device applicable as a corn planter.

The front of the main beam is upheld by bifurcated standard, S', carrying at its lower end between the arms, *g g'*, the movable surface roller, R', which precedes the furrow hoe and levels the ground in front of same and at the same time balances and supports the device.

I do not deem it necessary to further describe the operation of the machine, or to explain the changes made in converting same from one form of planter to the other, since the illustration is sufficiently clear and explanatory for these purposes.

Having thus described my invention, what I claim, and desire to secure by Letters Patent, is—

In a seed planter, the combination, with a seed hopper for receiving and delivering different kinds of seed, a dropping chute, a removable feed cylinder for controlling the flow of seed from the hopper to the chute, and a removable seed agitator located in the hopper, of removable gearing for imparting motion to the feed cylinder and agitator from the main axle of the vehicle, said gearing consisting of the intermeshing gear wheels O, P, Z and Z', the crank arm M connected to the gear O, a crank extension L on the main axle of the vehicle, and a connecting rod K for imparting motion from the axle to the gear wheel O, substantially as set forth.

In testimony whereof I affix my signature in presence of two witnesses.

GEORGE WITTICH.

Witnesses:
C. T. WITTICH,
F. C. WOLTERS.